Figure 1:
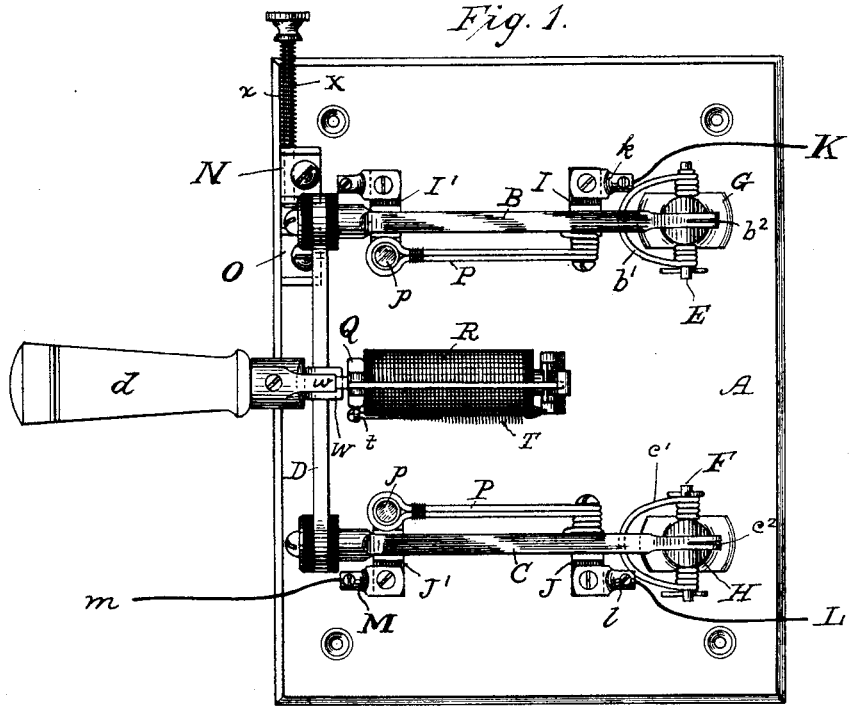

(No Model.) 2 Sheets—Sheet 1.
J. B. SMITH, A. W. FERRIN & A. L. CLOUGH.
ELECTRIC SWITCH.

No. 589,582. Patented Sept. 7, 1897.

Witnesses.
A. J. Lewis
F. A. Palmer

Inventors.
Joseph B. Smith,
Arthur W. Ferrin,
Albert L. Clough
By their Attorney (No Model.) 2 Sheets—Sheet 2.
J. B. SMITH, A. W. FERRIN & A. L. CLOUGH.
ELECTRIC SWITCH.
No. 589,582. Patented Sept. 7, 1897.
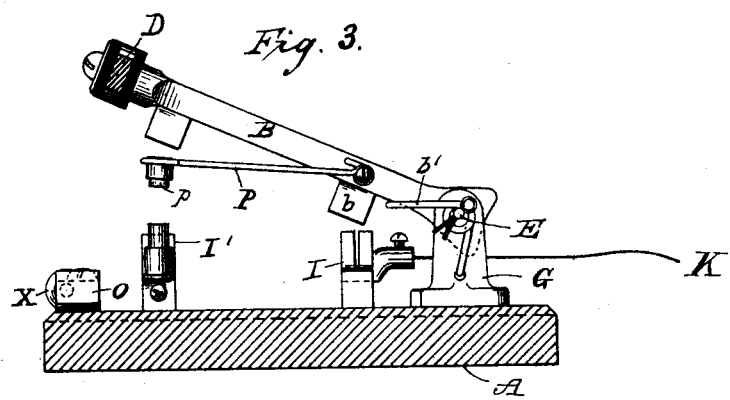
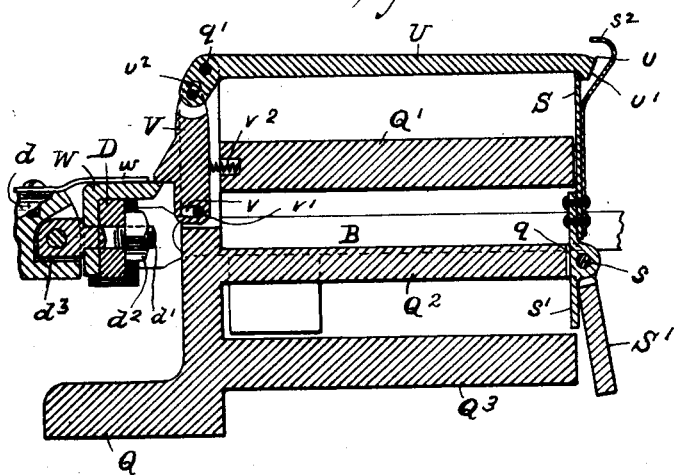
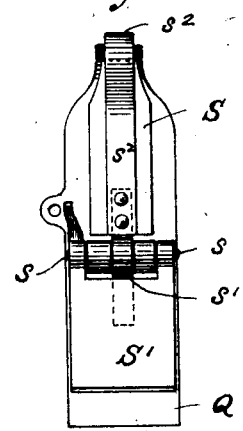
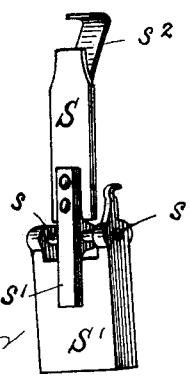
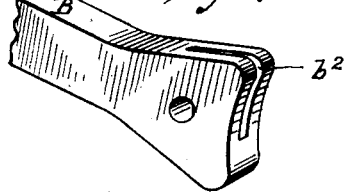
Witnesses
A. J. Lewis
F. A. Palmer
Inventors
Joseph B. Smith
Arthur W. Ferrin
Albert L. Clough
By their Attorney J. B. Thurston

UNITED STATES PATENT OFFICE.

JOSEPH B. SMITH, ARTHUR W. FERRIN, AND ALBERT L. CLOUGH, OF MANCHESTER, NEW HAMPSHIRE, ASSIGNORS TO THE BRODIE ELECTRIC COMPANY, OF SAME PLACE.

ELECTRIC SWITCH.

SPECIFICATION forming part of Letters Patent No. 589,582, dated September 7, 1897.

Application filed August 15, 1896. Serial No. 602,857. (No model.)

*To all whom it may concern:*

Be it known that we, JOSEPH B. SMITH, ARTHUR W. FERRIN, and ALBERT L. CLOUGH, citizens of the United States, residing at Manchester, in the county of Hillsborough and State of New Hampshire, have invented certain new and useful Improvements in Electric Switches; and we do hereby declare the following to be a full, clear, and exact description of the invention, such as will enable others skilled in the art to which it appertains to make and use the same.

This invention relates to electric switches which act upon the main circuit between the generator and motor.

Much damage is liable to result to a motor from careless handling, to wit: Excessive load may be thrown upon a motor when in action or the full electrical pressure when it is at rest, either of which circumstances may result in dangerously overheating and burning out the insulation of the machine. A device admirably calculated to overcome these difficulties was made the subject of two separate Letters Patent, one to Joseph B. Smith, No. 518,471, dated April 17, 1894, and one jointly to the said Smith and Albert L. Clough, No. 549,162, dated November 5, 1895; and the present invention, while embodying all the important functions of the invention covered by the above-mentioned patents, contains still further improvements, to which the following specification and claims will, as nearly as practicable, be confined.

The electromagnets used in the patents just referred to were so wound that when a motor was carrying its full load the magnetism was nearly equal in each magnetic spool, but in the present instance the spools are unequal in magnetism and independent.

The top spool is in series with the field-coils of the motor, and if the current in the field or in the main circuit fails the magnetism in said top spool is decreased, and by means of our improved releasing mechanism the switch is immediately and automatically thrown open, and if the current in the armature exceeds the amount at which the switch is set to open the lower spool attracts an armature, which is normally held off by a variable spring-tension, which immediately operates our improved releasing mechanism, and by means of our improved independent armatures for these electromagnets, the tension of one being variable, as before mentioned, our improved switch can be applied to motors of various capacity.

The objects of the invention are to improve the efficiency of a switch of this character by rendering it applicable to motors of various capacity and to improve certain features in its general construction, as fully set forth in the following specification and claims, and clearly illustrated in the accompanying drawings, forming a part of the same, of which—

Figure 2:
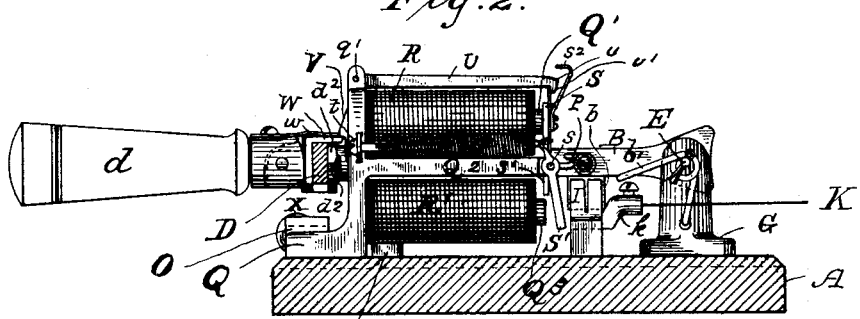

Figure 1 is a general plan view of the improved switch, Fig. 2 being a vertical sectional elevation of the same. Fig. 3 is a vertical sectional elevation showing the switch-levers opened. Fig. 4 is a sectional detail showing stand carrying the automatic releasing mechanism for opening the circuit with the cores for the magnets unwound. Fig. 5 is an end view of said stand, showing the independent armatures. Fig. 6 is a perspective view of the independent armatures as when disconnected from the stand carrying the magnets, each part being shown in its proper relative position. Fig. 7 is a perspective view of an end of one of the switch-levers.

Similar reference-letters designate corresponding parts in all the views.

A is a base-plate formed of some suitable insulating material.

B C are the switch-levers, which are united at one end by an insulated connection D, the opposite end of each being attached by a pivot, respectively E F, to a block or standard G H.

To the insulated connection D is secured a handle *d*, formed of hard rubber or other suitable insulating material, which, together with the metal switch-blades *b c*, secured, respectively, to the levers B C, and the forked metal contact-pieces I I' and J J', secured, respectively, directly below the said blades *b c* to the base-plate A, correspond with similar parts shown and described in patents previously mentioned.

K L represent the line-wires, connected, respectively, to the binder-posts *k l*, metallically connected to the contact-pieces I J.

M is a binder-post metallically connected to the contact-piece J', and to said binder-post M is secured a wire *m*, leading to the field-coil of a motor.

N O represent binder-posts secured to the base A, to which are secured wires *n o*, which run to a motor, performing the same service as do the similar wires shown in Patent No. 549,162.

P P are spring-contacts formed of wire, as shown, and carrying at their free ends carbon spools *p p*, which when the switch is closed touch the carbon spools *p' p'*, secured to the contact-pieces I' J', their function being to receive the spark which occurs upon breaking the circuit and act in a manner to hold the switch closed until the metallic contacts of the switch have parted, said spring-contacts being attached to the levers B C.

We will now describe the novel features of our present invention.

The springs *b' c'* are formed of a single piece of wire bent in the shape of a U and having their ends coiled around the ends of the pivot-studs E F, (which project at each side of the standards G H for this purpose and are provided with split pins for holding them in position, as shown,) passing thence into a perforation in either block or standard G H, the U portion of said springs bearing against the under side of either levers B B and serving to normally hold the switch in an open position, causing the circuit from the line to the motor to be interrupted.

The electromagnet-standard Q has three horizontal arms $Q' Q^2 Q^3$, the upper and under ones carrying the magnets, respectively, R R', the former being in series with the field-current of motor by means of wires $r\ r'$, leading, respectively, to the binder-post N and contact-piece I', and the latter being traversed by the armature-current of the motor by means of wires $r^2\ r^3$, leading, respectively, to the binder-post O and contact-piece I'.

The arm $Q^2$ has in its outer end a vertical slot *q*, the metal at each side of which is perforated for the pivot-pin *s*, as seen best in Fig. 6, and upon said pivot is mounted the double independently-actuated armatures S S', the former of which forms contact with the pole of the magnet R and the latter forms contact with the pole of the magnet R'.

The armature S projects slightly below the pivot *s*, as seen at *s'*, and the armature S', when under the influence of the pole of the magnet R', will bear against the projection *s'* of the armature S and free said armature from contact with said magnet R before said armature S' forms contact with the pole of the magnet R', and in order to render our improved switch applicable to motors of various capacity the tension-spring T, which connects the armature S' with a projection upon the standard Q and holds said armature normally away from the pole of the magnet R', is made capable of being increased or decreased by any convenient means. In the drawings this is shown to be accomplished by reducing the diameter of the helical coils of said spring at its end most remote from said armature to a size and number sufficient to fit the threads of a screw *t*, which passes loosely through a projection on the standard Q, and by turning the screw in either direction the proper or desired adjustment of the tension-spring is easily made, and said armature is thus made to require a greater or less magnetic influence to bring it in contact with the pole of said magnet R'.

The armature S, actuated by the field-current, is provided with a suitable spring-catch $s^2$, made substantially of the form shown, its function being to engage the curved and vertically-inclined end *u* of the lever U, the inclined portion of which projects slightly below the lower face of said lever, as at *u'*, so as to engage the top of the armature S.

The opposite end of the lever U is pivoted to the electromagnet-standard Q at *q'*, and below this pivotal point and located nearer the end of said lever is an elongated opening $u^2$, formed at a vertical angle, and to this is pivotally connected a horizontally-movable spring-actuated latch V, said latch having near its lower end a horizontally-elongated opening *v*, a pin *v'* passing through the standard Q at the proper point to enter said opening and limit the horizontal movement of said latch, which is normally forced outward by a suitable spring $v^2$, located in said standard.

The projection *u'* at the free end of the releasing-lever U locks the armature S in contact with the pole of its magnet R, serving to hold the lower armature S' away from its magnet during the period of excessive current at starting a motor, the operator being supposed to hold the switch closed as tightly as possible during this period in order to release the detent W from the catch V, thus permitting the projection *u'* to automatically engage the armature S.

When the operator releases his grasp on the switch-handle, the lever U rises slightly under the action of the switch-lever springs *b' c'*, causing the detent W to bear against the catch V, thus raising the lever U and releasing the projection *u'* from the armature, the top or curved portion of said lever then engaging with the curved spring $s^2$, which is made of sufficient tension to normally overcome the natural tendency of the detent W upon the insulated connection D to force in the horizontally-movable spring-actuated latch.

If the projection *u'* were not provided upon the lever U, the initial current would draw the lower or spring-actuated armature S' into contact with the pole of its magnet, where it would remain, holding the upper armature away from its magnet, thus preventing the switch from being held closed automatically.

In addition to this automatic releasing device adapted to open the switch-levers we also show a manual releasing device for the lever U. The handle $d$ may be in some convenient manner pivotally connected to the insulated connection D, so that it may have a slight upward movement before it shall raise the levers B C, the said movement being limited in the following manner: A flat spring $w$ is secured to the top of the handle $d$ and extends upon the detent W to a point normally in close proximity to the horizontally-movable spring-actuated latch V, and the upward movement of the handle $d$ will cause the spring $w$ to move horizontally and depress the latch V clear of the detent W, thus disengaging the projection $u'$ of the lever U from the armature S, leaving the switch-lever free to open. We illustrate in Fig. 4 a section of the handle $d$ and the connection D in proper relative position, the handle being pivoted to a stud $d'$, which passes through a perforation in the connection D and is secured therein by a threaded nut $d^2$, the lower outside edge of the stud $d'$ being provided with a shoulder $d^3$, which by contact with the connecting portion of said handle limits the downward motion of the handle $d$ to a position in alinement with the switch-levers B C.

The springs $b'$ $c'$ are sufficiently strong to throw open the switch-levers B C as far as they could go, and if their open movement were to be limited by a rigid stop of any sort against which they might be caused to strike more or less damage would result. To overcome this difficulty, we cut a vertical slot, respectively $b^2$ $c^2$, in the extended end of each lever B C, as clearly shown in the broken perspective view, Fig. 7, by means of which slot the said ends may be expanded to cause sufficient friction within and against the sides of the standards G H when the switch is opened to stop the levers B C in a position at right angles or thereabout with the base A during the automatic action of the switch.

X is a spring-actuated spindle passing through a perforation in the binder-post N and adapted to be brought in contact with the binder-post O, metallically connecting said parts N O for purpose of short-circuiting the magnet which is in series with the field of a motor, causing the switch to open in the same manner as through the failure of the current, as previously described, the function of the spring $x$ being to hold the said spindle normally from or out of contact with the said post O.

Having described our invention, what we claim is—

1. In an electric switch, electric magnets in series with the field-current and armature-current of an electric motor, independent armatures under the influence of said magnets, spring-actuated switch-blades, a spring attached to one of said armatures for holding it normally away from the pole of the magnet traversed by the armature-current, and means whereby a variation of current in the armature or field circuit causes the switch to automatically open.

2. In an electric switch, means for holding that armature of the switch which is under the influence of the motor armature-current away from its magnet during the period of excessive current incident upon the starting of the motor, comprising a releasing-lever provided with a projection at its free end adapted to engage the armature S only when said lever is not under the influence of the opening-springs acting through the detent W and catch V.

3. An electric switch, electromagnets in series with the field-current and armature-current of a motor, independent armatures under the influence of said magnets, means for automatically opening said switch by an excess of the armature-current or a failure of the current in the field or the main circuit, and a variable spring-tension device adapted to cause one of said armatures to resist to a predetermined extent the influence of the pole of that magnet traversed by the armature-current of a motor, substantially for the purpose set forth.

4. An electric switch having a pair of electromagnets in series with the field and armature current of a motor, a pair of independent armatures adapted each to be influenced by one of said magnets, a releasing mechanism consisting of a pivoted lever having a long and short arm, the outer end of said long arm being adapted for contact with the armature influenced by the pole of that magnet which is in series with the field-current of a motor and with a suitable spring attached to said armature, a horizontally spring-actuated latch movably connected to the short arm of said pivoted lever and to the electromagnet frame or standard, a detent upon the switch-lever connection engaging said latch, a pivotally-connected handle for said switch-levers, and a suitable spring attached to said handle and adapted to depress said latch by an upward movement of the handle.

5. In an electric switch, slotted standards secured to a suitable base, spring-actuated levers for opening and closing the circuit pivotally connected within the slots of said standards, said levers having a slot formed in their end at a right angle with their pivot, substantially for the purpose set forth.

6. In an automatic electric switch, a manual releasing mechanism consisting of a suitable detent attached to the switch-levers, a spring-actuated latch normally engaging said levers, a handle pivotally connected to said switch-levers, and carrying a flat spring secured to the top of the handle and resting upon the detent in close proximity to said spring-actuated latch and adapted to move horizontally to depress the same.

7. A manual releasing device for automatic electric switches consisting of a handle loosely connected to the switch-levers, a detent rigidly attached to said levers, a spring-actuated latch adapted to normally engage said detent, and a flat spring secured to the handle and adapted to move horizontally upon the detent to depress said spring-actuated latch.

In testimony whereof we affix our signatures in presence of two witnesses.

JOSEPH B. SMITH.
ARTHUR W. FERRIN.
ALBERT L. CLOUGH.

Witnesses:
J. B. THURSTON,
FRANK C. TWOMBLY.